United States Patent

[11] 3,578,347

[72] Inventor  Chadwell O'Connor
             1596 Mountain St., Pasadena, Calif. 91104
[21] Appl. No. 842,451
[22] Filed     July 17, 1969
[45] Patented  May 11, 1971

[54] INSTRUMENT PANHEAD SEAL
     1 Claim, 5 Drawing Figs.
[52] U.S. Cl. .................................................. 277/205
[51] Int. Cl. .................................................. F16j 15/32
[50] Field of Search ........................................ 277/205,
                                                 206, (Inquired)

[56]            References Cited
              UNITED STATES PATENTS
2,529,098  11/1950  Noll ................................. 277/205X
2,547,185   4/1951  Von Bolhar ....................... 277/205X
2,733,567   2/1956  Zellweger ......................... 277/205X
2,867,457   1/1959  Riesing et al. .................... 277/205
2,951,721   9/1960  Asp ................................. 277/MD Digest
3,199,831   8/1965  Sully ............................... 277/205X
3,301,568   1/1967  Perry .............................. 277/206

*Primary Examiner*—Laverne D. Geiger
*Assistant Examiner*—Robert I. Smith
*Attorney*—Wolfe, Hubbard, Leydig, Voit & Osann ABSTRACT: A rotary seal for instrument panheads in which the seal is a unitary annular body of Teflon formed with two seating surfaces in contact with the sides of a sealing region and one sealing surface in light resilient contact with a relatively rotatable surface against which the seal must be made. In one form, the annular seal body is U-shaped in cross section with a lip being formed on one leg of the U to define the sealing surface. In another form, the seal is shaped as a Belleville washer. In each case, pressure within the chamber being sealed acts to urge the sealing surfaces more tightly against the sides of the sealing recess.

Patented May 11, 1971
3,578,347
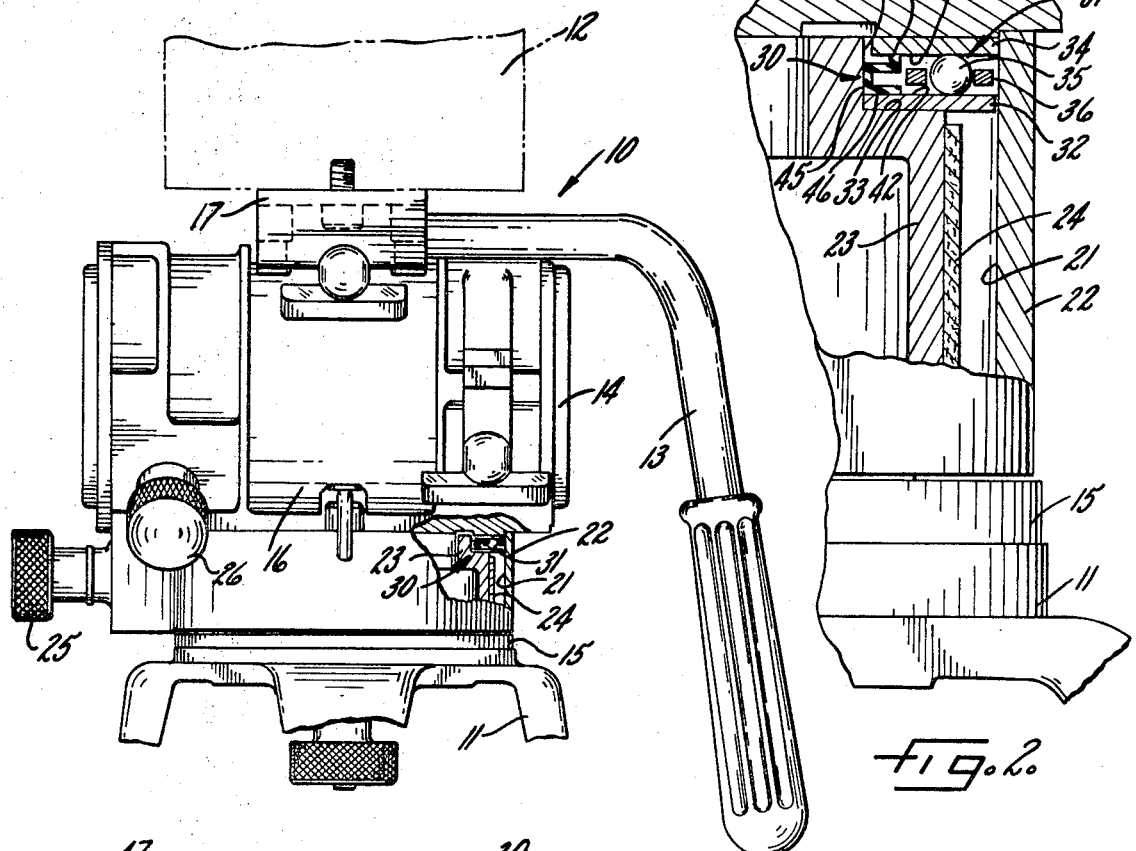
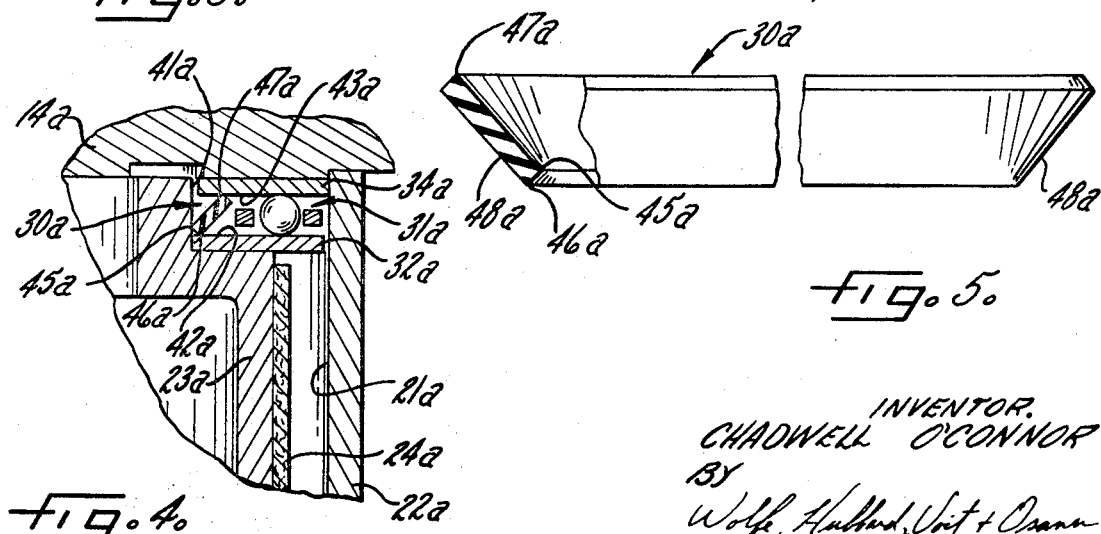
INVENTOR.
CHADWELL O'CONNOR
BY
Wolfe, Hubbard, Voit & Osann
ATTORNEYS.

3,578,347

INSTRUMENT PANHEAD SEAL

DESCRIPTION OF THE INVENTION

This invention relates generally to rotary seals and more particularly concerns a rotary seal for instrument panheads.

A so-called "fluid" panhead obtains control of panning and tilting movements by interposing a viscous fluid between relatively moveable parts of the panhead. The chambers in which the fluid is located must be sealed against leakage of the fluid and entry of dust and dirt. Seals for this purpose present a number of special problems not encountered in more conventional sealing applications.

First, such seals should develop only the lightest frictional drag forces since a precision panhead should be capable of smooth movement in response to a very slight turning force and be capable also of developing a turning speed that is directly dependent on the amount of turning force. A seal which has a high static frictional force, or which sticks or chatters upon being moved, tends to cause jerkiness in the panhead motion.

Second, a seal should develop no springback force as is sometimes encountered with molded resilient sealing elements. When turning force is withdrawn from a panhead, it should stop immediately without jerking or tending to jump back even a thousandth of an inch or so.

Third, the seal must be tolerant of silicone formulations which are often used as the panhead "fluid." Ordinary rubber, for example, tends to shrink in contact with silicone and hence is not a suitable sealing material for this application.

Fourth, the seal must effectively seal, even under fairly severe pressure differentials since panheads are often used in aircraft operating in greatly reduced air pressures as compared to sea level pressures.

It is therefore, the primary aim of the invention to provide a novel rotary seal for instrument panheads which develops a very low static sealing force even though a considerable sealing area is involved as in a large diameter annular seal.

Another object of the invention is to provide a seal of the above kind which has a sort of check valve action so that reduced outside pressure causes the pressure in the chamber being sealed to increase the sealing forces and thus prevent leakage.

A further object is to provide a seal as characterized above which is formed of material compatible with silicone fluid and which gives a smooth, nonsticking, no-springback motion when rotated against a sealing surface.

Other objects and advantages of the invention will become apparent upon reading the following detailed description and upon reference to the drawings, in which:

FIG. 1 is a side elevation of a panhead with a portion broken away showing a seal of the invention;

FIG. 2 is an enlarged fragmentary section of a portion of the panhead structure shown in FIG. 1;

FIG. 3 is a further enlarged fragmentary section and elevation of the seal otherwise shown in FIGS. 1 and 2;

FIG. 4 is a fragmentary section similar to FIG. 2 showing a second modification of the inventive seal; and FIG. 5 is similar to FIG. 3 and it shows the seal appearing in FIG. 4 in enlarged form.

While the invention will be described in connection with certain preferred embodiments, it will be understood that I do not intend to limit the invention to those embodiments. On the contrary, I intend to cover all alternatives, modifications and equivalents as may be included within the spirit and scope of the invention.

Turning first to FIG. 1, there is shown a panhead 10 mounted on a stand 11 and supporting an instrument 12 such as a camera. The panhead 10 provides for both tilting and panning movement of the instrument 12 relative to the stand 11 in response to manual pressure exerted on a handle 13. To this end, the panhead 10 includes a main body 14, that rotates about a vertical axis on a base 15, and a cylindrical portion 16 that carries an instrument platform 17 and which rotates about a horizontal axis on the main body 14.

Panning movement control is obtained from the presence of a silicone fluid, not shown, in a chamber 21 defined by a skirt member 22 depending from the main body 14 and a pedestal 23 extending upwardly from the base 15. Preferably, a cork surfaced band 24 is anchored to the member 22 so as to be adjustably drawn about the pedestal 23 in response to rotation of a knob 25. The adjusting knob 25 permits the amount of resistance to panning movement to be precisely controlled. A similar arrangement having a knob 26 controls resistance to tilting movement of the platform 17.

An annular seal 30 embodying the invention is positioned in an annular sealing region defined by a bearing assembly 31 at the upper end of the chamber 21. The bearing assembly 31 includes a first ring plate 32 that is on a shoulder 33 of the pedestal 23, a second ring plate 34 on which the panhead body 14 rests, and a plurality of ball bearings 35 interposed between the flat ring plates 32, 34 which are held in place by a retainer 36. The annular sealing region is therefore defined by a pair of angled surfaces 41 and 42, formed by the pedestal 23 and the bearing ring 32, and the relatively rotatable surface 43 of the bearing ring 34 which is spaced a fixed distance from the surface 42. The spacing between the surfaces 42, 43 can be precisely controlled since it is determined by the finish of these surfaces and the dimension of the bearings 35.

In accordance with the invention, the seal 30 includes an annular unitary body formed of resilient material and having a pair of sealing surfaces 45 and 46 in sealing arrangement with the surfaces 41, 42, respectively, and a sliding surface 47 in sealing rotatable contact with the surface 43, the body of the seal being formed so that it is slightly deflected to fit into the sealing region with the result that the sliding surface 47 resiliently bears on the surface 43. Also, the seal body is formed with a surface 48 exposed to the chamber 21 and extending from the sliding surface 47 so that pressure increases in the chamber tend to urge the surfaces 45, 47 against their respective sealing region surfaces 47, 43. In other words, the seal 30 acts with a check valve effect in the sense that higher pressures, when developed in the chamber 21, cause tighter sealing of the surfaces 45, 47 against the respective surfaces 47, 43.

In the embodiment of FIGS. 1 to 3, the body of the seal 30 is generally U-shaped in cross section with the bottom and one leg of the U defining the surfaces 45, 46. A lip 49 is formed on the other leg of the U, with the lip 49 defining the surface 47. Preferably, the seal 30 is formed of teflon, a tough, low coefficient of friction plastic that is inert with respect to silicone compositions. The seal 30 is, in the preferred embodiment, machined from a ring of teflon with the spacing between the surfaces 46, 47 being just slightly greater than the spacing between the plate ring surfaces 42, 43 so that a good seal is established with very little friction between the surfaces 43, 47. It will be recalled that the construction of the bearing assembly 31 permits precise adjustment of the spacing between the surfaces 42, 43, and machining the seal 30 from a solid piece of teflon permits correspondingly precise spacing between the surfaces 46, 47. The cross-sectional U-shape of the seal 30 provides good resilience for urging the surface 47 against the surface 43 and also produces the check valve action described above.

A seal 30a (see FIGS. 4 and 5) also embodies the invention and in this embodiment parts corresponding to those previously described have been given the same reference number with the distinguishing suffix a added. Thus, the seal 30a is positioned in a sealing region defined by surfaces 41a, 42a and 43a formed, respectively, on a pedestal 23a and by rings 32a and 34a of a bearing assembly 31a. A chamber 21a is closed by the seal 30a, the chamber being formed between the pedestal 23a and a skirt 22a depending from a main panhead body 14a.

In this embodiment, the body of the seal 30a, formed of teflon as is the seal 30, is generally shaped as a Belleville washer with one pair of corner portions defining sealing surfaces 45a and 46a and an opposite corner portion defining a sliding surface 47a. Again, the body of the seal 30a is formed so that it must be slightly deflected in fitting into the sealing recess, with the result that the surface 47a is resiliently urged against the surface 43a. It will be seen that a rising pressure in the chamber 21a will act on a surface 48a to urge the surfaces 47a and 45a into tighter sealing engagement.

In summary, it can be seen that the seals 30 and 30a are formed so that very low static sealing forces are exerted even though their diameter is substantial. The annular chambers 21 and 21a are deliberately formed to have large diameters so as to provide a maximum amount of surface acted upon by the silicone material. This, of course, requires a large diameter seal and accentuates the problems of sealing in this application.

The shape of the seals 30 and 30a provides a check valve action so that, when panheads using such seals are employed in an area of reduced pressure, as when employed employed in an airplane, the check valve effect will increase the sealing effectiveness and prevent leakage. The small area defined by the surfaces 47 and 47a helps to insure low frictional contact between the relatively movable parts of the seal, and the use of teflon not only provides a seal that is inert with respect to silicone but also insures a tough, low-friction sealing assembly. During relative rotation of the seals 30, 30a and the surfaces 43, 43a there is no deflection of the seals which could store energy and cause a springback motion of the panhead when a panning or tilting force on the panhead is removed.

I claim:

1. In an instrument panhead having a chamber ending in an annular sealing region defined by a pair of angled interconnected surfaces opposed by a relatively rotatable surface spaced a fixed distance from one of said interconnected surfaces, an annular seal for said region comprising a unitary body formed of resilient Teflon material, said body having a pair of sealing surfaces in firm engagement with said pair of angled surfaces, said body being general generally U-shaped, in cross section, opening toward said chamber so that the bottom and one leg of the U define said pair of sealing surfaces, said body also having a sliding surface formed by an annular lip, on the other leg of said body, in sealing movable contact with said rotatable surface so that the body provides a sealing barrier between said rotatable surface and said interconnected surfaces, said body being formed so that said other leg must be slightly deflected into said region and said sliding surface resiliently bears on said rotatable surface, and said body also being formed with a surface exposed to said chamber and extending from said sliding surface so that increases in pressure in said chamber tend to urge said sliding surface into contact with said rotatable surface.